(12) United States Patent
Konno et al.

(10) Patent No.: US 9,251,188 B2
(45) Date of Patent: Feb. 2, 2016

(54) INFORMATION PROCESSING DEVICE

(75) Inventors: Kiyotaka Konno, Tokyo (JP);
Shinichiro Kamei, Tokyo (JP)

(73) Assignee: NEC CORPORATION, Tokyo (JP)

( * ) Notice: Subject to any disclaimer, the term of this patent is extended or adjusted under 35 U.S.C. 154(b) by 182 days.

(21) Appl. No.: 13/823,823

(22) PCT Filed: Nov. 4, 2011

(86) PCT No.: PCT/JP2011/006160
§ 371 (c)(1),
(2), (4) Date: May 14, 2013

(87) PCT Pub. No.: WO2012/060105
PCT Pub. Date: May 10, 2012

(65) Prior Publication Data
US 2013/0238620 A1     Sep. 12, 2013

(30) Foreign Application Priority Data

Nov. 5, 2010  (JP) ................................. 2010-248208

(51) Int. Cl.
*G06F 17/30*     (2006.01)
(52) U.S. Cl.
CPC .... *G06F 17/30312* (2013.01); *G06F 17/30946* (2013.01)
(58) Field of Classification Search
CPC ................................................ G06F 17/30781
See application file for complete search history.

(56) References Cited

U.S. PATENT DOCUMENTS

| 5,974,235 | A | * | 10/1999 | Nunally et al. | ............... 709/202 |
| 8,204,955 | B2 | * | 6/2012 | McBride et al. | .............. 709/217 |
| 8,872,940 | B2 | * | 10/2014 | Marman et al. | ........... 348/231.3 |
| 2006/0078047 | A1 | * | 4/2006 | Shu et al. | ................. 375/240.01 |
| 2011/0055158 | A1 | * | 3/2011 | Tapper et al. | ................. 707/627 |

FOREIGN PATENT DOCUMENTS

| CN | 1761319 A | 4/2006 |
| CN | 101098469 A | 1/2008 |
| JP | 2001092731 A | 4/2001 |
| JP | 2007199764 A | 8/2007 |

(Continued)

OTHER PUBLICATIONS

The international search report for PCT/JP2011/006160 mailed on Feb. 7, 2012.

(Continued)

*Primary Examiner* — Khanh Pham

(57) ABSTRACT

An information processing device includes: an analysis information storing means for storing each of analyzed raw data so as to be associated with analysis portion specification information; a storage destination information storing means for storing each of the raw data so as to be associated with a raw data storage destination address referring to a raw data managing device storing the each raw data; a raw data specifying means for specifying raw data associated with analysis portion specification information corresponding to portion designation information designating a predetermined time portion in combined analysis result information; and a distribution instructing means for instructing a raw data managing device specified by a raw data storage destination address associated with the specified raw data to distribute raw data of the time portion corresponding to the designated portion designation information.

8 Claims, 11 Drawing Sheets

(56) References Cited

FOREIGN PATENT DOCUMENTS

| | | | |
|---|---|---|---|
| JP | 2007257335 A | 10/2007 | |
| JP | 2008016895 A | 1/2008 | |
| JP | 2008299584 A | 12/2008 | |
| JP | 2010049384 A | 3/2010 | |
| JP | 2010123069 A | 6/2010 | |
| JP | 2010183334 A | 8/2010 | |

OTHER PUBLICATIONS

Chinese Office Action for CN Application No. 201180052928.9 issued on Oct. 8, 2015 with English Translastion.

* cited by examiner

Fig.3

| HOST NAME | COMBINED ANALYSIS RESULT RECEPTION ADDRESS | RAW DATA RECEPTION ADDRESS | NAME OF COMBINED ANALYSIS RESULT GENERATING DEVICE TO BE USED |
|---|---|---|---|
| AP1 | http://ap1.nec.co.jp:8801 | http://ap1.nec.co.jp:81 | COMBINED ANALYSIS RESULT GENERATING DEVICE |
| | | | |

Fig.4

| RAW DATA NAME | RAW DATA MANAGING DEVICE ADDRESS | COMBINED ANALYSIS RESULT GENERATING DEVICE NAME |
|---|---|---|
| RAW DATA A | http://raw-a.nec.co.jp:8801 | COMBINED ANALYSIS RESULT GENERATING DEVICE |
| RAW DATA B | http://raw-b.nec.co.jp:8801 | COMBINED ANALYSIS RESULT GENERATING DEVICE |
| | | |

Fig.5

| COMBINED ANALYSIS RESULT GENERATING DEVICE NAME | TIMESTAMP | RAW DATA NAME |
|---|---|---|
| COMBINED ANALYSIS RESULT GENERATING DEVICE | 10:10 | RAW DATA A |
| COMBINED ANALYSIS RESULT GENERATING DEVICE | 10:11 | (NO RAW DATA: INFERENCE) |
| COMBINED ANALYSIS RESULT GENERATING DEVICE | 10:12 | RAW DATA A |
| COMBINED ANALYSIS RESULT GENERATING DEVICE | 10:13 | RAW DATA A |
| COMBINED ANALYSIS RESULT GENERATING DEVICE | 10:14 | RAW DATA A |
| COMBINED ANALYSIS RESULT GENERATING DEVICE | 10:14 | RAW DATA B |
| COMBINED ANALYSIS RESULT GENERATING DEVICE | 10:15 | RAW DATA A |
| COMBINED ANALYSIS RESULT GENERATING DEVICE | 10:15 | RAW DATA B |
| COMBINED ANALYSIS RESULT GENERATING DEVICE | 10:16 | (NO RAW DATA: INFERENCE) |
| COMBINED ANALYSIS RESULT GENERATING DEVICE | 10:17 | RAW DATA B |
| COMBINED ANALYSIS RESULT GENERATING DEVICE | 10:18 | RAW DATA B |
| COMBINED ANALYSIS RESULT GENERATING DEVICE | 10:19 | RAW DATA B |
| COMBINED ANALYSIS RESULT GENERATING DEVICE | 10:20 | RAW DATA B |

Fig.6

(a) APPLICATION REGISTERING UNIT DATA FORMAT

<COMBINED ANALYSIS RESULT RECEPTION ADDRESS>, <RAW DATA RECEPTION ADDRESS>, <NAME OF COMBINED ANALYSIS RESULT GENERATING DEVICE TO BE USED>

EXAMPLE. http://ap1.nec.co.jp:8801, http://ap1.nec.co.jp:81, COMBINED ANALYSIS RESULT GENERATING DEVICE (b) ENGINE REGISTERING UNIT DATA FORMAT <RAW DATA NAME>, <MANAGING DEVICE ADDRESS>, <COMBINED ANALYSIS RESULT GENERATING DEVICE NAME>

EXAMPLE. RAW DATA A, http://raw-a.nec.co.jp:8801, COMBINED ANALYSIS RESULT GENERATING DEVICE EXAMPLE. RAW DATA B, http://raw-b.nec.co.jp:8801, COMBINED ANALYSIS RESULT GENERATING DEVICE (c) RAW DATA DISTRIBUTION INSTRUCTION DATA FORMAT <START TIME OF ACQUISITION TARGET RAW DATA>, <END TIME OF ACQUISITION TARGET RAW DATA>

EXAMPLE. 10:00:00, 10:15:00

INFORMATION PROCESSING DEVICE

This application is a National Stage Entry of PCT/JP2011/006160 filed Nov. 4, 2011, which claims priority from Japanese Patent Application 2010-248208 filed Nov. 5, 2010, the contents of all of which are incorporated herein by reference, in their entirety.

TECHNICAL FIELD

The present invention relates to an information processing device, more specifically, relates to an information processing device that supports supply of raw data analyzed by a plurality of analysis engines.

BACKGROUND ART

In recent years, in accordance with improvement of the information processing technology, an analysis engine which analyzes various data has been developed. For example, an analysis engine that generates position information tracing the flow of a person from moving image data, an analysis engine that specifies a person from still image data, an analysis engine that generates text data from speech data, and the like, have been developed.

The results of analysis by these analysis engines are utilized for various purposes, and there is a case that raw data as the analysis source is needed. For example, when position information tracing the flow of a person from moving image data is analyzed and there is a concern in the position information, moving image data as raw data of the concern is searched for and reproduced.

As a method for handling a plurality of media and instructing reproduction, a method using a multimedia content markup language such as the Synchronized Multimedia Integration Language (SMIL) by the World Wide Web Consortium (W3C) is known. The SMIL enables instruction to reproduce many types of media by designation of places to store the media, layout on a display and time to reproduce information such as a still image, a moving image, a speech and a text.

Further, an example of a technique for reproducing raw data that is the source of a data analysis result is disclosed in Patent Document 1. In the technique disclosed in Patent Document 1, firstly, image parameters representing the characters of video images that are raw data captured by cameras are acquired, and the image parameters are associated with the cameras having captured the images. Then, a camera associated with a desired image parameter is specified, and a video image captured by the camera is displayed.

Patent Document 1: Japanese Unexamined Patent Application Publication No. 2010-183334

On the other hand, in the case of performing reproduction of raw data that is the analysis source as mentioned above, there is a need to previously designate a storage place of a media which is to perform the reproduction. However, because the abovementioned SMIL is designed as a language emphasizing objects such as synchronous reproduction of a plurality of contents like text and a moving image and layout on a screen, it is impossible to handle information associating raw data with an analysis result, and a problem that it is impossible to obtain raw data in a desired site from the analysis result arises.

In a case that raw data used for analysis by an analysis engine is one, an application that requests for raw data to an analysis engine can relatively easily mange raw data corresponding to the result of analysis by the analysis engine by using a timestamp or the like. However, in the case of reproducing a plurality of raw data analyzed by a plurality of analysis engines or reproducing any of the raw data, management by the application is difficult. That is to say, for managing a combined analysis result obtained by combining a plurality of analysis results and respective raw data that are the analysis sources, a function of managing by each application what are raw data corresponding to the combined analysis result and what addresses raw data managing devices managing the raw data exist in is required. Consequently, a problem that management of raw data is considerably inefficient arises. These problems are obvious when the number of raw data to be analyzed increases, or when a combined analysis result is handled by a plurality of applications.

SUMMARY

Accordingly, an object of the present invention is to solve the aforementioned problem that it is difficult to manage a system referring to raw data that is the source of a combined analysis result.

In order to achieve the object, an information processing device according to an exemplary embodiment of the present invention includes:

an analysis information storing means for storing each of raw data having been analyzed by a plurality of analysis engines, respectively, so as to be associated with analysis portion specification information that specifies a time portion in which the each raw data has been analyzed; and a storage destination information storing means for storing each of the raw data analyzed by the analysis engines, respectively, so as to be associated with a raw data storage destination address that refers to a raw data managing device in which the each raw data is stored and managed, the information processing device also including:

a raw data specifying means for accepting portion designation information that designates a predetermined time portion in combined analysis result information obtained by integrating analysis results of analysis by the respective analysis engines, and specifying the raw data associated with the analysis portion specification information corresponding to the portion designation information, from inside the analysis information storing means; and a distribution instructing means for acquiring the raw data storage destination address associated with the raw data specified by the raw data specifying means from inside the storage destination information storing means, and instructing the raw data managing device specified by the storage destination address to distribute the raw data of the time portion corresponding to the designated portion designation information.

Further, an information processing system according to another exemplary embodiment of the present invention includes:

a combined analysis result generating device being equipped with a plurality of analysis engines, integrating analysis results of analysis of raw data by the respective analysis engines, and including a raw data managing device that stores and manages each of the raw data;

an application device receiving combined analysis result information from the combined analysis result generating device; and an information processing device connected with the combined analysis result generating device and the application device, wherein the information processing device comprises:
an analysis information storing means for storing each of the raw data so as to be associated with analysis portion specification information that specifies a time portion in which the each raw data has been analyzed; and
a storage destination information storing means for storing each of the raw data so as to be associated with a raw data storage destination address that refers to the raw data managing device; and
wherein the information processing device also comprises:
a raw data specifying means for accepting portion designation information that designates a predetermined time portion in the combined analysis result information from the application device, and specifying the raw data associated with the analysis portion specification information corresponding to the portion designation information, from inside the analysis information storing means; and
a distribution instructing means for acquiring the raw data storage destination address associated with the raw data specified by the raw data specifying means from inside the storage destination information storing means, and instructing the raw data managing device specified by the storage destination address to distribute the raw data of the time portion corresponding to the designated portion designation information to the application device.

Further, a computer program according to another exemplary embodiment of the present invention is a computer program comprising instructions for causing an information processing device, which comprises: an analysis information storing means for storing each of raw data having been analyzed by a plurality of analysis engines, respectively, so as to be associated with analysis portion specification information that specifies a time portion in which the each raw data has been analyzed; and a storage destination information storing means for storing each of the raw data analyzed by the analysis engines, respectively, so as to be associated with a raw data storage destination address that refers to a raw data managing device in which the each raw data is stored and managed, to realize:
a raw data specifying means for accepting portion designation information that designates a predetermined time portion in combined analysis result information obtained by integrating analysis results of analysis by the respective analysis engines, and specifying the raw data associated with the analysis portion specification information corresponding to the portion designation information, from inside the analysis information storing means; and
a distribution instructing means for acquiring the raw data storage destination address associated with the raw data specified by the raw data specifying means from inside the storage destination information storing means, and instructing the raw data managing device specified by the storage destination address to distribute the raw data of the time portion corresponding to the designated portion designation information.

Further, an information processing method according to another exemplary embodiment of the present invention includes, by an information processing device, which comprises: an analysis information storing means for storing each of raw data having been analyzed by a plurality of analysis engines, respectively, so as to be associated with analysis portion specification information that specifies a time portion in which the each raw data has been analyzed; and a storage destination information storing means for storing each of the raw data analyzed by the analysis engines, respectively, so as to be associated with a raw data storage destination address that refers to a raw data managing device in which the each raw data is stored and managed:
accepting portion designation information that designates a predetermined time portion in combined analysis result information obtained by integrating analysis results of analysis by the respective analysis engines, and specifying the raw data associated with the analysis portion specification information corresponding to the portion designation information, from inside the analysis information storing means; and
acquiring the raw data storage destination address associated with the raw data specified by the raw data specifying means from inside the storage destination information storing means, and instructing the raw data managing device specified by the storage destination address to distribute the raw data of the time portion corresponding to the designated portion designation information.

With the configurations described above, the present invention has an effect that management for supplying raw data corresponding to a combined analysis result is facilitated.

BRIEF DESCRIPTION OF DRAWINGS

FIG. 3 is a diagram showing an example of data stored in an application storing unit disclosed in FIG. 2;
FIG. 4 is a diagram showing an example of data stored in an engine storing unit disclosed in FIG. 2;
FIG. 5 is a diagram showing an example of data stored in a linked information storing unit disclosed in FIG. 2;
FIGS. 6A to 6C are views showing various kinds of data formats used in a system disclosed in FIG. 2.

EXEMPLARY EMBODIMENTS

First Exemplary Embodiment

A first exemplary embodiment of the present invention will be described with reference to FIGS. 1 to 10. FIGS. 1 to 6 are diagrams for describing a configuration of a system in this exemplary embodiment, and FIGS. 7 to 10 are diagrams for describing an operation of the system.

An information processing system in the present invention is an information processing system which is suitable for the use of analyzing raw data such as moving image data and speech data and acquiring raw data as the source of a combined analysis result obtained by combining a plurality of analysis results. For example, the information processing system can be used for combining a flow analysis engine for specifying the flow of a person based on moving image data with sensor information for specifying a person such as RFID to generate a combined analysis result, and reproducing moving image data on a certain timestamp in order that a user checks an analysis result on the timestamp in the combined analysis result. Moreover, the information processing system can be used for reproducing a speech on a certain timestamp for the purpose of checking the content of an utterance by a speech recognition engine that converts the content of an utterance into a text based on a plurality of speeches in a situation like a meeting. However, the present invention is not limited to the abovementioned uses.

[Configuration]

Figure 1:
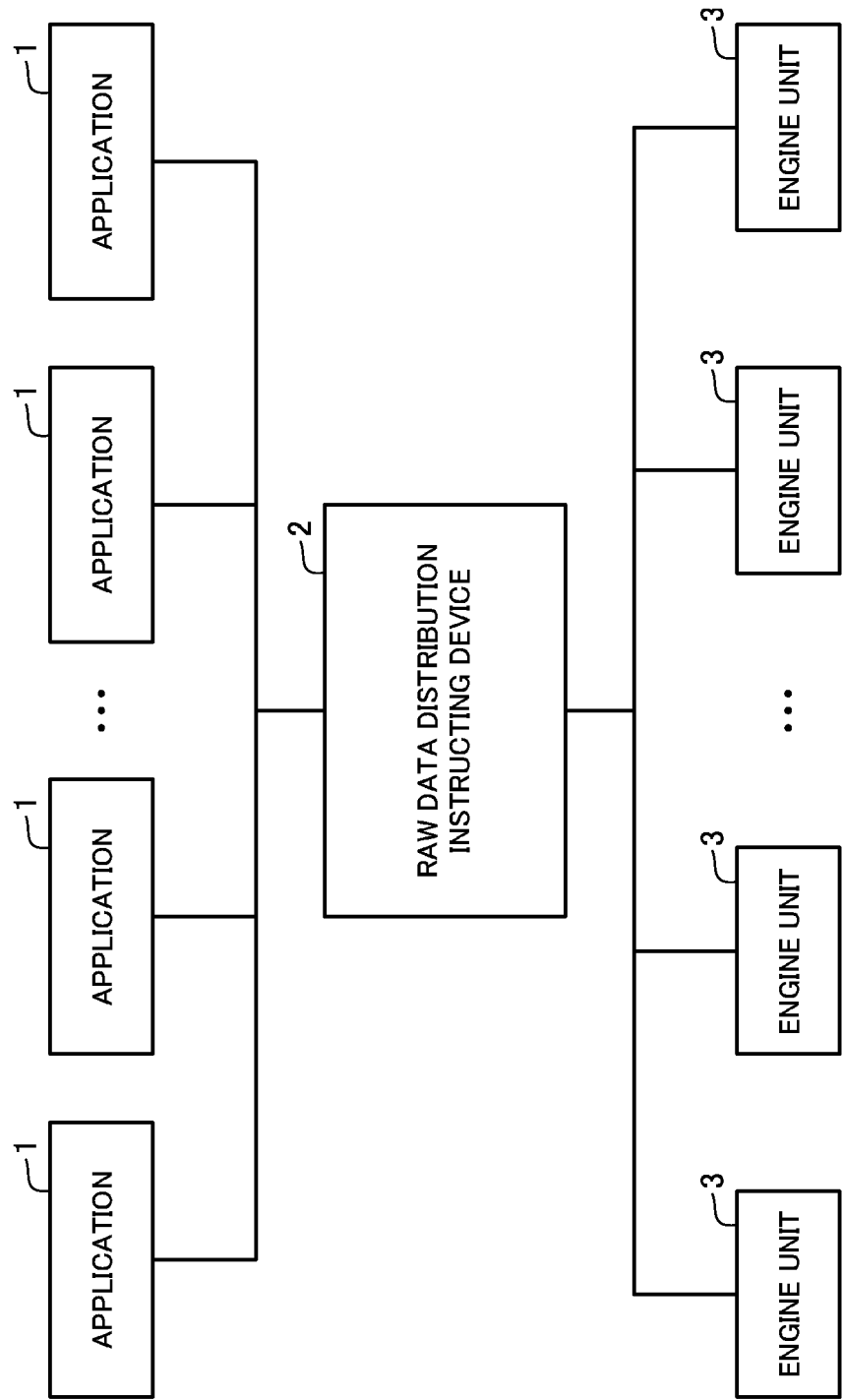
FIG. 1 is a block diagram showing a configuration of a whole system according to the present invention.

The information processing system in the first exemplary embodiment includes a raw data distribution instructing device 2 connected with a plurality of applications 1 and engine units 3 as shown in FIG. 1. However, it is not always required to install more than one applications 1 and engine units 3.

The abovementioned application 1 (an application device) is a device which executes a process by using combined analysis result information. For example, the application 1 has a function of outputting by displaying combined analysis result information for a user operating the application 1, outputting by displaying raw data that is the analysis source of the combined analysis result, and so on.

To be specific, the application 1 has a function of receiving a combined analysis result from the engine unit 3. Moreover, the application 1 has a function of designating a timestamp that specifies a time portion in combined analysis result information to the raw data distribution instructing device 2, thereby making a request for distribution of raw data of the timestamp portion and receiving the raw data as the result of the request from the engine unit 3. Although a plurality of applications 1 are installed in FIG. 1, only one application 1 may be installed as shown in FIG. 2.

The engine units 3 are a group of information processing devices each having a function of analyzing a plurality of raw data by a plurality of analysis engines, respectively, and combining analysis results to generate a combined analysis result, a function of storing raw data having been used for analysis into a storage device and distributing, and so on. Raw data to be analyzed is information in nature such as a moving image, a still image and a speech, and input information by a sensor or the like. The analysis engine executes, for example, an analysis process of generating position information tracing the flow of a person based on a moving image, an analysis process of specifying a person based on a still image, and an analysis process of generating text information based on a speech. However, raw data to be analyzed in the present invention is not limited to the abovementioned raw data. Moreover, the analysis engine in the present invention is not limited to the analysis engine executing the analysis processes described above.

Further, the engine unit 3 has a function of receiving an instruction to distribute raw data from the raw data distribution instructing device 2 to distribute the raw data to the application 1, generating a combined analysis result obtained by combining analyzed raw data to supply to the raw data distribution instructing device 2, and managing raw data having been used for analysis. Although only engine unit 3 is installed in FIG. 2, a plurality of engine units 3 may be installed as shown in FIG. 1.

Figure 2:
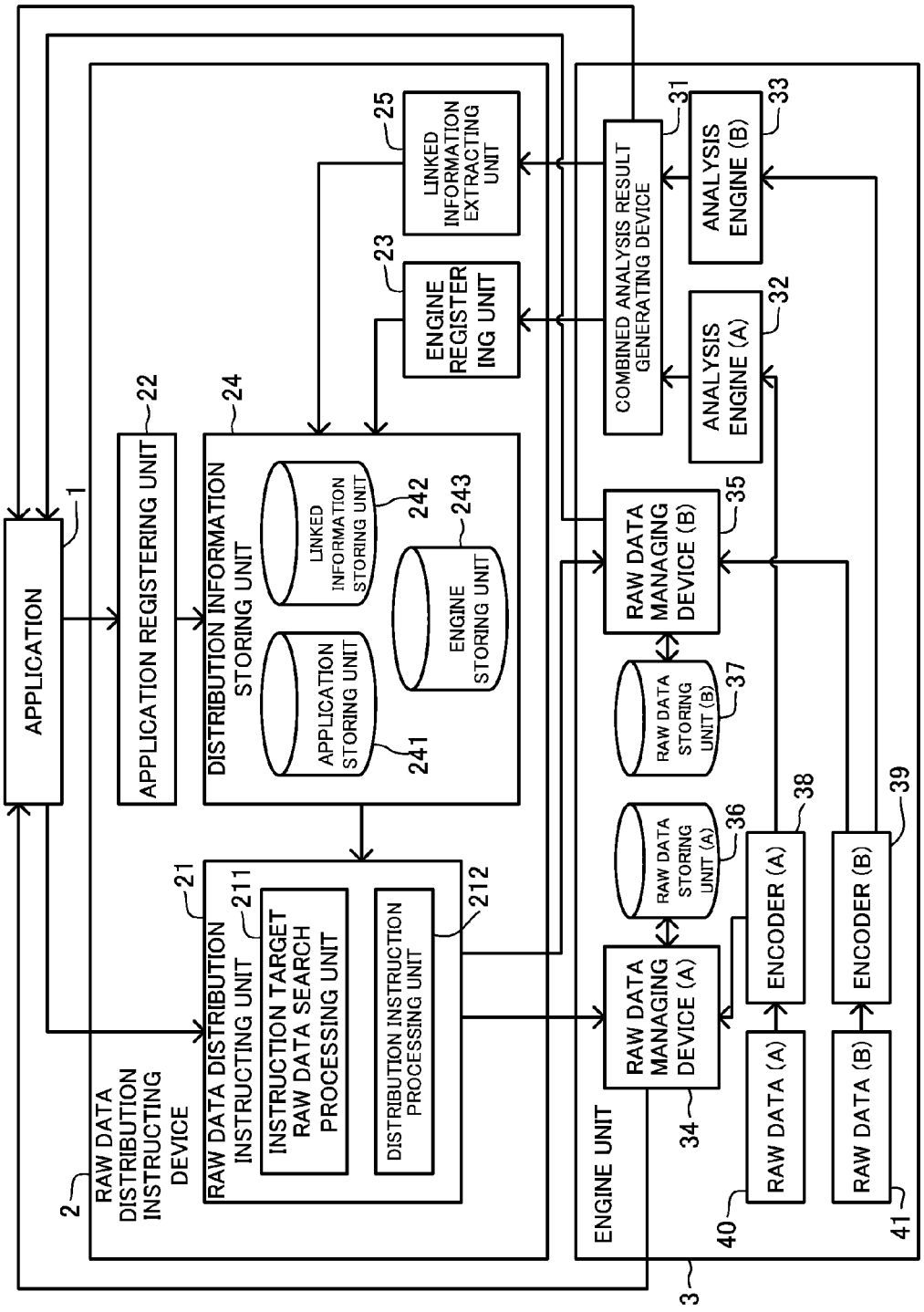
FIG. 2 is a block diagram showing a schematic configuration of a raw data distribution instructing unit and an engine unit in a first exemplary embodiment of the present invention.

To be specific, as shown in FIG. 2, the engine unit 3 includes a combined analysis result generating device 31, an analysis engine (A) 32, an analysis engine (B) 33, a raw data managing device (A) 34, a raw data managing device (B) 35, a raw data storing unit (A) 36, a raw data storing unit (B) 37, an encoder (A) 38, an encoder (B) 39, raw data (A) 40, and raw data (B) 41.

The abovementioned raw data (A) 40 and raw data (B) 41 each represents an information inputting device such as a video camera, a microphone and a sensor, and shows that information such as a moving image, a speech and RFID information is inputted. In this exemplary embodiment, two raw data (A) and (B) are included, but the engine unit 3 may be configured so that three or more raw data may be supplied.

The abovementioned encoder (A) 38 and encoder (B) 39 are devices having a function of digitalizing information of the raw data (A) 40 and the raw data (B) 41, respectively, and supplying to the raw data managing devices and the analysis engines. In this exemplary embodiment, two encoders are installed because two raw data are supplied, but more than two encoders may be installed depending on the number of raw data.

The abovementioned raw data managing device (A) 34 and raw data managing device (B) 35 receive digitalized raw data supplied from the encoders, respectively, and store the respective raw data into the raw data storing unit (A) 36 and the raw data storing unit (B) 37, respectively. Moreover, the raw data managing device (A) 34 and the raw data managing device (B) 35 each have a function of supplying the raw data to the application 1 in accordance with an instruction from the raw data distribution instructing device 2 as described later. In this exemplary embodiment, two raw data managing devices are installed because two raw data are supplied, but more than two raw data managing devices may be installed depending on the number of raw data.

The abovementioned raw data storing unit (A) 36 and raw data storing unit (B) 37 are storage devices storing digitalized raw data. The raw data storing unit (A) 36 and the raw data storing unit (B) 37 are storage devices storing and supplying raw data in accordance with instructions from the abovementioned raw data managing device (A) 34 and raw data managing device (B) 35, respectively.

The abovementioned analysis engine (A) 32 and analysis engine (B) 33 are devices analyzing raw data digitalized by the respective encoders and extracting characteristic information. For example, each of the analysis engine (A) 32 and the analysis engine (B) 33 is an engine that performs analysis of a flow using a moving image, specification of a person using a still image, generation of a text using a speech and specification of a person based on sensor information such RFID information. Outputs by the respective analysis engines 32 and 33 are supplied to the combined analysis result generating device 31. In this exemplary embodiment, two analysis engines are installed because there are two encoders, but more than two analysis engines are installed depending on the number of encoders.

The abovementioned combined analysis result generating device 31 is a device which combines analysis results supplied by the respective analysis engines. The combined analysis result generating device 31 receives analysis results from the plurality of analysis engines, generates one combined analysis result, and supplies to a linked information extracting unit 25 of the raw data distribution instructing device 2. Moreover, the combined analysis result generating device 31 supplies the names of the raw data and the addresses of the raw data managing devices included in the engine unit 3 and the name of the combined analysis result generating device to an engine registering unit 23 of the raw data distribution instructing device 2. Supplying to the engine registering unit 23 may be performed by, instead of the combined analysis result generating device 31, a device separately configured to manage information of the engine unit 3.

Next, the raw data distribution instructing device 2 will be described. The raw data distribution instructing device 2 is a device which has, as main functions, a function of accepting a combined analysis result supplied by the engine unit 3, and a function of accepting a request for distribution of raw data from the application 1 and instructing the engine unit 3 to distribute the raw data.

To be specific, as shown in FIG. 2, the raw data distribution instructing device 2 has a raw data distribution instructing unit 21, an application registering unit 22, an engine registering unit 23, a distribution information storing unit 24, and a linked information extracting unit 25. The distribution information storing unit 24 is formed in a storage device installed in the raw data distribution instructing device 2 serving as an information processing device. Moreover, the raw data distribution instructing unit 21, the application registering unit 22, the engine registering unit 23 and the linked information extracting unit 25 are constructed by embedding programs into an arithmetic device installed in the raw data distribution instructing device 2 serving as an information processing device.

The abovementioned raw data distribution instructing unit 21 has an instruction target raw data search processing unit 211 and a distribution instruction processing unit 212. These processing units 211 and 212 will be described in detail later.

The abovementioned distribution information storing unit 24 has an application storing unit 241, a linked information storing unit 242, and an engine storing unit 243. Data stored in the respective storing units will be described in detail later.

At the time of initialization of the system, the abovementioned application registering unit 22 receives a "combined analysis result reception address," a "raw data reception address" and a "name of a combined analysis result generation device to be used" supplied by the application 1, and stores into the application storing unit 241 (an application information storing means) together with a "name of a host," which is the application itself. FIG. 3 shows an example of data stored in the application storing unit 241. A "combined analysis result reception address" is an address where the application 1 receives a combined analysis result, and a "raw data reception address" is an address where the application 1 receives raw data.

FIG. 6A shows a data format when the application 1 supplies a "combined analysis result reception address," a "raw data reception address" and a "combined analysis result generating device name" to the application registering unit 22 of the raw data distribution instructing device 2. The application registering unit 22 acquires a "host name" from network information in addition to the abovementioned information, and stores into the application storing unit 241.

The abovementioned engine registering unit 23 (an engine registering means) receives a "raw data name" a "raw data managing device address" and a "combined analysis result generating device name" supplied by the engine unit 3, and stores into the engine storing unit 243 (a storage destination information storing means). FIG. 4 shows an example of data stored in the engine storing unit 243. A "raw data name" is information specifying each raw data analyzed by each analysis engine (each-raw-data specification information), and a "raw data managing device address" is an address referring to each of the raw data managing devices 34 and 35 storing and managing each raw data, which is an address for accessing each of the raw data managing devices 34 and 35 (an each-storage-destination address). Moreover, a "combined analysis result generation device name" is information specifying the combined analysis result generation device 31 that generates a combined analysis result and supplies combined analysis result information to the application 1 and the raw data distributing device 2.

FIG. 6B shows a data format when the engine unit 3 supplies a "raw data name," a "raw data managing device address" and a "combined analysis result generation device name" to the engine registering unit 23. As shown in this example, the same number of records as the number of raw data used by the engine unit 3 are supplied to the engine registering unit 23, and stored into the engine storing unit 243.

The abovementioned linked information extracting unit 25 (an analysis information extracting means) receives a combined analysis result supplied by the engine unit 3, extracts a "combined analysis result generation device name," a "timestamp" and a "raw data name," and stores into the linked information storing unit 242 (an analysis information storing means). FIG. 5 shows an example of data stored in the linked information storing unit 242. A "combined analysis result generating device name" is information specifying the combined analysis result generation device 31 having combined the results of analysis of the respective raw data. Moreover, a "raw data name" is information specifying each raw data analyzed by each analysis engine (each-raw-data specification information). A "timestamp" is analysis portion specification information that specifies a predetermined time portion in each raw data having been analyzed. For example, "time" is used as a timestamp.

A "timestamp" in FIG. 5 represents a start time of raw data, and it is assumed that the raw data is stored for one minute from the start time. A "timestamp" represents "time" in the example shown in FIG. 5, but may be information representing "time and date," or may include information representing "year, month and date." Moreover, a "timestamp" is not always required to include information representing time, and may be any information that can specify a predetermined time portion in raw data.

The aforementioned instruction target raw data search processing unit 211 (a raw data specifying means) receives timestamps of start and end of raw data supplied by the application 1. That is to say, the instruction target raw data search processing unit 211 accepts timestamps (portion designation information) that designate a certain time portion in combined analysis result information designated by a user having seen the combined analysis result information on the application 1. Then, the instruction target raw data search processing unit 211 searches the linked information storing unit 242, specifies timestamps corresponding to the timestamps designated in the linked information storing unit 242, acquires a list of the specified timestamps and raw data names, and supplies to the distribution instruction processing unit 212. For example, when timestamps on and after start time 10:10 and before end time 10:14 are designated from the application 1, the instruction target raw data search processing unit 211 specifies raw data associated with corresponding timestamps on and above the fourth line from the top in FIG. 5.

Further, the aforementioned distribution instruction processing unit 212 (a distribution instructing means) searches the engine storing unit 243 to find the "raw data names" included in the list of the timestamps and the raw data names transmitted by the instruction target raw data search processing unit 211. Then, the distribution instruction processing unit 212 acquires "raw data managing device addresses" associated with the searched "raw data names" from the engine storing unit 243, and instructs the raw data managing devices 34 and 35 specified by these addresses to distribute raw data equivalent to the time portion of the designated timestamps.

For example, in the same manner as described above, when timestamps on and after start time "10:10" and before end time 10:14 are designated on the application 1, "raw data A" with the specified timestamps on and after 10:10 before 10:14 is specified with reference to FIG. 5, and a raw data managing device address "http://raw-a.nec.co.jp:8801" is specified with reference to FIG. 4. Thus, the distribution instruction processing unit 212 instructs the raw data managing device (A) 34 shown by the specified address to distribute the "raw data A" with the timestamps on and after 10:10 and before 10:14 to the application 1.

At this moment, by the host name of the application 1 having received a request for distribution of raw data, the distribution instruction processing unit 212 acquires a "raw data reception address" that is an address where the application 1 receives the raw data, from the application storing unit 241. Then, the distribution instruction processing unit 212 instructs the raw data managing device to distribute the raw data to the acquired "raw data reception address."

FIG. 6C shows a data format when the application 1 instructs the raw data distribution instructing unit 21 to instruct distribution of raw data. As shown in this example, by supplying the start and end of timestamps to acquire raw data to the raw data distribution instructing unit 21, distribution of the raw data is instructed to the respective raw data managing devices of the engine unit 3 as described above.

[Operation]

Next, an operation of the abovementioned information processing system will be described with reference to FIGS. 1 to 6 mentioned above and also with reference to flowcharts shown in FIGS. 7 to 10.

(At the Time of Initialization)

1) Initial Information Registration by Application

At first, with reference to FIGS. 2 and 7, an operation when the application 1 registers initialization data into the raw data distribution instructing device 2 will be described.

Figure 7:
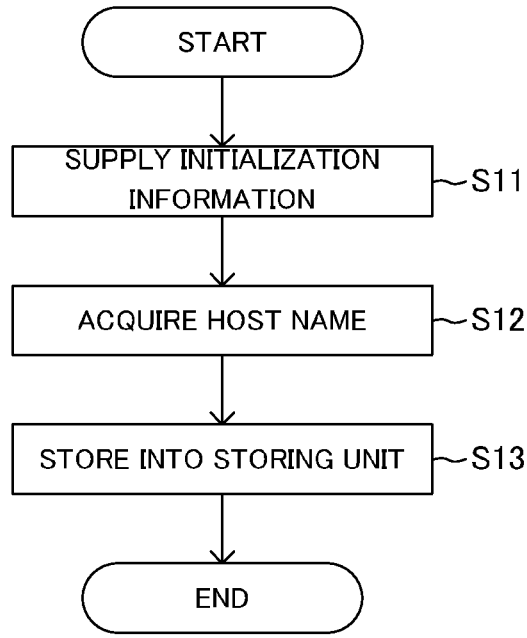
FIG. 7 is a flowchart showing an operation of the system disclosed in FIG. 2.

The application 1 supplies a "combined analysis result reception address" for receiving a combined analysis result, a "raw data reception address" for receiving raw data, and a "name of a combined analysis result generating device" generating a combined analysis result to be used, to the application registering unit 22 (step S11 in FIG. 7).

Subsequently, the application registering unit 22 acquires a "name of a host" that is the supply source of the abovementioned information from network information (step S12 in FIG. 7), and stores the respective information having been supplied and the acquired host name so as to be associated with each other into the application storing unit 241 (step S13 in FIG. 7).

2) Initial Information Registration by Engine Unit

Next, with reference to FIGS. 2 and 8, an operation when the engine unit 3 registers initialization data into the raw data distribution instructing device 2 will be described.

Figure 8:
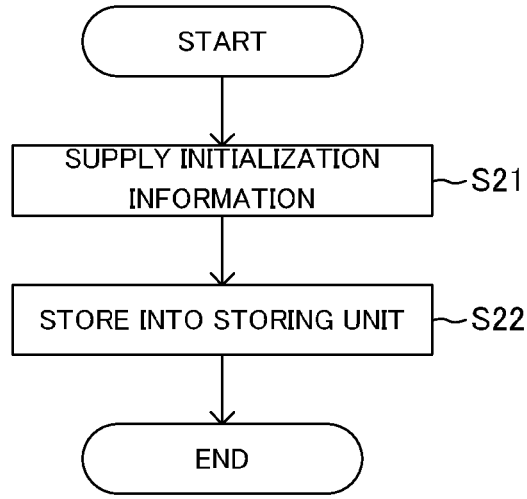
FIG. 8 is a flowchart showing an operation of the system disclosed in FIG. 2.

The engine unit 3 supplies a "name of raw data" being used for analysis, a "raw data managing device address" of a raw data managing device that manages raw data, and a "combined analysis result generation device name" to the engine registering unit 23 (step S21 in FIG. 8). Then, the engine registering unit 23 stores the supplied information into the engine storing unit 243 (step S22 in FIG. 8).

(At the Time of Distribution of Combined Analysis Result)

Next, with reference to FIGS. 2 and 9, an operation when the raw data distribution instructing device 2 receives a combined analysis result from the engine unit 3 will be described.

Figure 9:
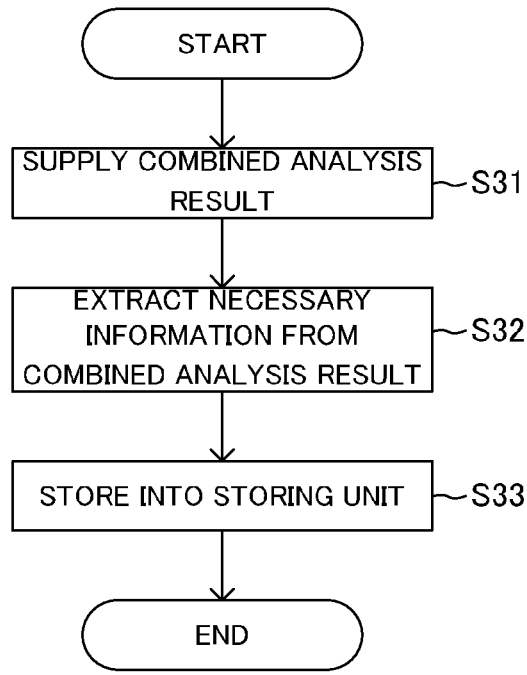
FIG. 9 is a flowchart showing an operation of the system disclosed in FIG. 2.

The engine unit 3 generates combined analysis result information obtained by combining the results of analysis of the respective raw data by the analysis engines, and supplies the analysis result information to the linked information extracting unit 25 from the combined analysis result generating device 31 (step S31 in FIG. 9). Subsequently, the linked information extracting unit 25 acquires a "combined analysis result generating device name," a "timestamp" and a "raw data name" from the received combined analysis result information (step S32 in FIG. 9). Then, the linked information extracting unit 25 stores the respective information having been acquired into the linked information storing unit 242 (step S33 in FIG. 9).

As mentioned before, information stored in the application storing unit 241, the engine storing unit 243 and the linked information storing unit 242 are not always required to be registered into the respective storing units 241, 243 and 242 by the application registering unit 22, the engine registering unit 23 and the linked information extracting unit 25, and may be registered by an operator in advance, for example.

(At the Time of Instruction to Distribute Raw Data)

Next, with reference to FIGS. 2 and 10, an operation before raw data is distributed from the engine unit 3 in accordance with a raw data distribution instruction from the application 1 will be described.

Figure 10:
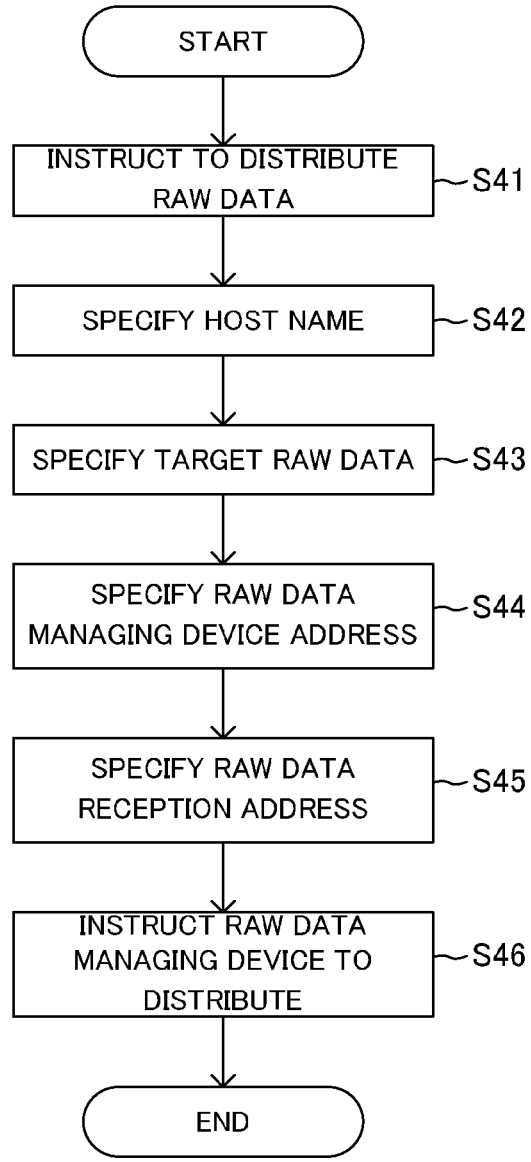
FIG. 10 is a flowchart showing an operation of the system disclosed in FIG. 2.

At first, the application 1 supplies start and end timestamps of raw data to be acquired to the raw data distribution instructing unit 21 (step S41 in FIG. 10). Then, the instruction target raw data search processing unit 211 of the raw data distribution instructing unit 21 acquires the name of a host having requested the raw data from network information (step S42 in FIG. 10).

Subsequently, the instruction target raw data search processing unit 211 searches the application storing unit 241 to find the acquired host name, and acquires a "name of a combined analysis result generation device to be used" associated with the found "host name." Then, the instruction target raw data search processing unit 211 acquires "raw data names" existing between the designated start and end timestamps from among data associated with the acquired "combined analysis result generating device name," and supplies a list of the timestamps and the raw data names to the distribution instruction processing unit 212 (step S43 in FIG. 10).

Subsequently, the distribution instruction processing unit 212 searches the engine storing unit 243 by using the "raw data names" included in the supplied list, and acquires "raw data managing device addresses" associated with the "raw data names" (step S44 in FIG. 10). Moreover, the distribution instruction processing unit 212 searches the application storing unit 241 by using the "host name" acquired at step S42, and acquires a "raw data reception address" associated with the "host name" (step S45 in FIG. 10).

Then, the distribution instruction processing unit 212 supplies the "raw data reception address" and the "start and end timestamps" to the respective "raw data managing device addresses" based on the "raw data managing device addresses" and "raw data reception address" having been acquired and the "list of the start and end timestamps," and instructs to distribute the raw data with timestamps between the start and end timestamps (step S46 in FIG. 10).

As described above, according to the system of this exemplary embodiment, only by registering information of an application and an engine at the time of initialization, supplying a combined analysis result in accordance with the information of the application at the time of distribution of a combined analysis result, and designating start and end timestamps at the time of instruction to distribute raw data, it is possible to cause the application to acquire the raw data. Consequently, the application can acquire necessary raw data without managing a device that manages raw data, and management of distribution of raw data is facilitated. In particular, even when an analysis engine that generates an analysis result to be included in combined analysis result information is added or an application is added, it is possible to acquire desired raw data as described above only by adding registration information in the raw data distribution instructing device 2, and therefore, the abovementioned effect is obvious.

Second Exemplary Embodiment

Figure 11:
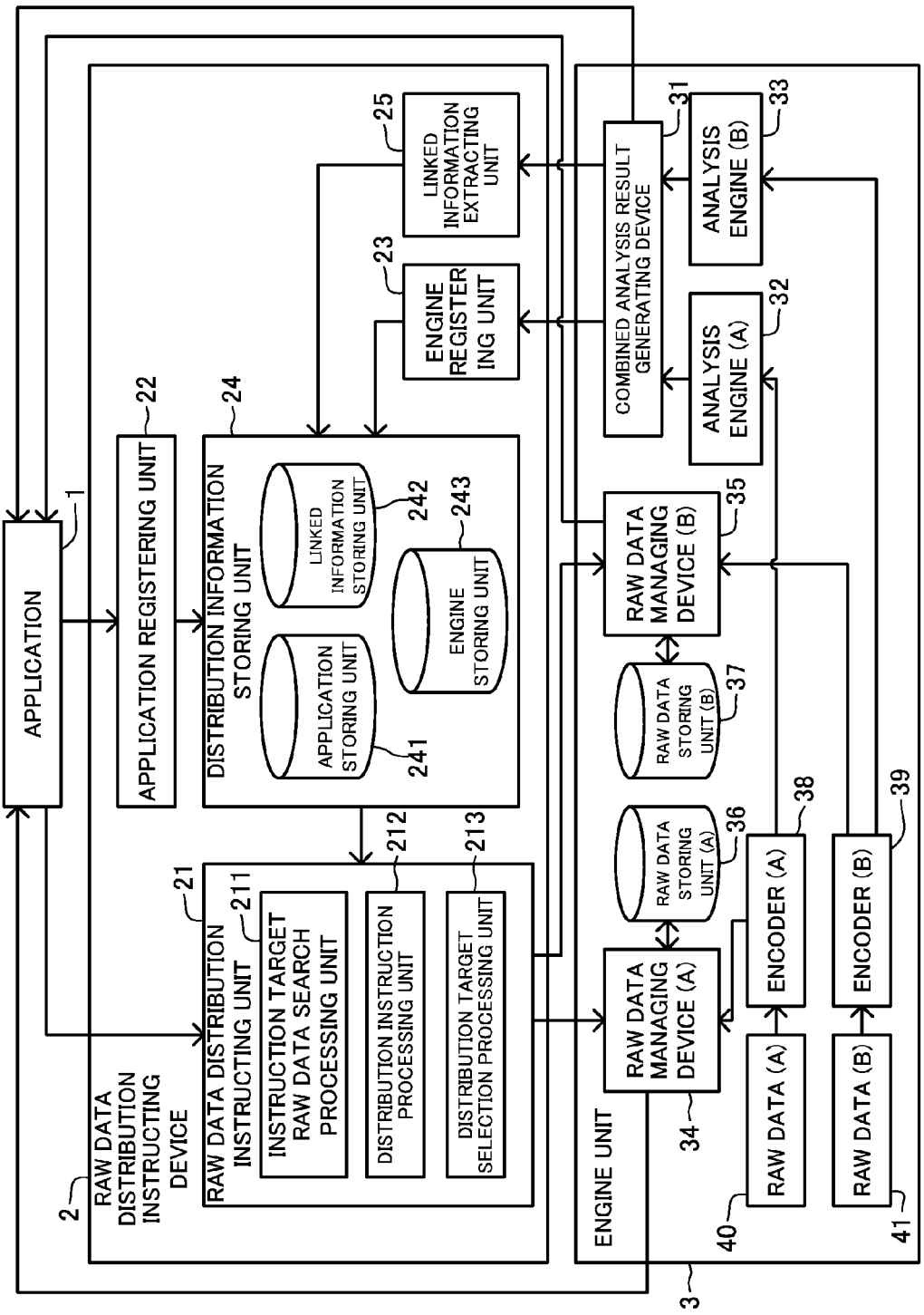
FIG. 11 is a block diagram showing a schematic configuration of a raw data distribution instructing unit and an engine unit in a second exemplary embodiment of the present invention.
Figure 12:
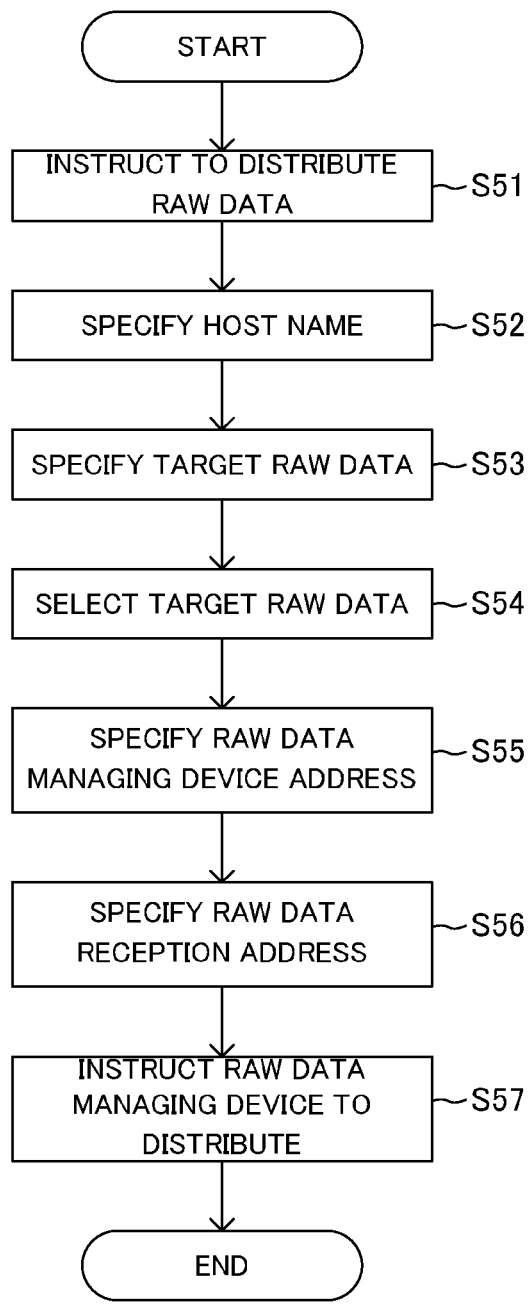
FIG. 12 is a flowchart showing an operation of a system disclosed in FIG. 11.

Next, a second exemplary embodiment of the present invention will be described with reference to FIGS. 11 and 12. FIG. 11 is a diagram for describing a configuration of a system in this exemplary embodiment, and FIG. 12 is a diagram for describing an operation of the system.
[Configuration]
An information processing system according to this exemplary embodiment has almost the same configuration as in the first exemplary embodiment, and is configured by adding a distribution target selection processing unit 213 (a distribution target selecting means) into the raw data distribution instructing unit 21 of the raw data distribution instructing device 2 as shown in FIG. 11.

A difference from the system according to the first exemplary embodiment will be described. At first, in the same manner as described above, the instruction target raw data search processing unit 211 receives start and end timestamps of raw data supplied by the application 1, searches the linked information storing unit 242, acquires a list of target timestamps and raw data names, and supplies the list to the distribution target selection processing unit 213. Then, the distribution target selection processing unit 213 selects data to be distributed from among the distribution target raw data having been acquired, and supplies the result to the distribution instruction processing unit 212.

Selection of raw data by the distribution target selection processing unit 213 is performed by detecting a portion in which a timestamp exists in duplicate, namely, a portion in which a plurality of "raw data" exist at the same time from the list of the "raw data names" acquired by the instruction target raw data search processing unit 211 and selecting any of the raw data. For example, the distribution target selection processing unit 213 selects the same raw data as raw data existing before or after the portion where the timestamp exists in duplicate so that raw data to be distributed can be distributed as consecutively as possible.

To be specific, in the example shown in FIG. 5, both the "raw data A" and the "raw data B" exist on a timestamp 10:14 and, assuming that data existing on and after a timestamp 10:10 and before a timestamp 10:15 are required, the "raw data A" consecutively exist before the timestamp 10:14, and therefore, the "raw data A" is selected for the timestamp 10:14 that both the data exist. On the other hand, assuming that data existing on and after the timestamp 10:15 and before a timestamp 10:20 are required, the "raw data B" consecutively exist after the timestamp 10:15, and therefore, the "raw data B" is selected for the timestamp 10:15 that both the data exist.

Such selection is effective, for example, in a case that the "raw data A" is moving image data captured by a "camera A" and the "raw data B" is moving image data captured by a "camera B." In this case, raw data acquired by the same camera is distributed by selecting consecutive raw data, so that it is possible to smoothly reproduce.

Then, the distribution instruction processing unit 212 searches the engine storing unit 243 to find the raw data names in the supplied list, namely, find "raw data names" acquired by the instruction target raw data search processing unit 211, in which data in a portion where a timestamp exists in duplicate is selected by the distribution target selection processing unit 213, and acquires corresponding "raw data managing device addresses." After that, the distribution instruction processing unit 212 instructs the respective raw data managing devices to distribute the raw data in accordance with the acquired "raw data managing device addresses."
[Operation]
Next, an operation at the time of instruction to distribute raw data in the system according to the second exemplary embodiment will be described with reference to FIGS. 11 and 12.

At first, the application 1 supplies start and end timestamps of raw data to be acquired to the raw data distribution instructing unit 21 (step S51 in FIG. 12). Then, the instruction target raw data search processing unit 211 of the raw data distribution instructing unit 21 acquires the name of a host having requested for the raw data, from network information (step S52 in FIG. 12).

Subsequently, the instruction target raw data search processing unit 211 searches the application storing unit 241 to find the acquired host name, and acquires a "name of a combined analysis result generation device to be used" associated with the found "host name." Then, the instruction target raw data search processing unit 211 acquires "raw data names" existing between the designated start and end timestamps from among data associated with the acquired "combined analysis result generation device name," and supplies a list of the timestamps and the raw data names to the distribution target selection processing unit 213 (step S53 in FIG. 12).

The distribution target selection processing unit 213 detects a portion in which a timestamp exists in duplicate in the supplied list, selects raw data so that raw data to be distributed can be distributed as consecutively as possible, and supplies the result to the distribution instruction processing unit 212 (step S54 in FIG. 12). In selection of raw data in a portion in which a timestamp exists in duplicate, for example, the same raw data as raw data existing before or after the portion is selected as mentioned before.

Subsequently, the distribution instruction processing unit 212 searches the engine storing unit 243 by using the "raw data names" included in the supplied list, and acquires "raw data managing device addresses" associated with the "raw data names" (step S55 in FIG. 12). Moreover, the distribution instruction processing unit 212 searches the application storing unit 241 by using the "host name" acquired at step S52, and acquires a "raw data reception address" associated with the "host name" (step S56 in FIG. 12).

Then, the distribution instruction processing unit 212 supplies the "raw data reception address" and the "start and end timestamps" to the respective "raw data managing device addresses" based on the "raw data managing device addresses" and "raw data reception address" having been acquired and the "list of the start and end timestamps," and instructs to distribute the raw data with timestamps between the start and end timestamps (step S57 in FIG. 12).

Also in this exemplary embodiment, the application can acquire necessary raw data without managing a device that manages raw data, and management is facilitated. In particular, in this exemplary embodiment, it is possible to acquire consecutive raw data, so that it is possible to smoothly reproduce.

<Supplementary Notes>

Figure 13:
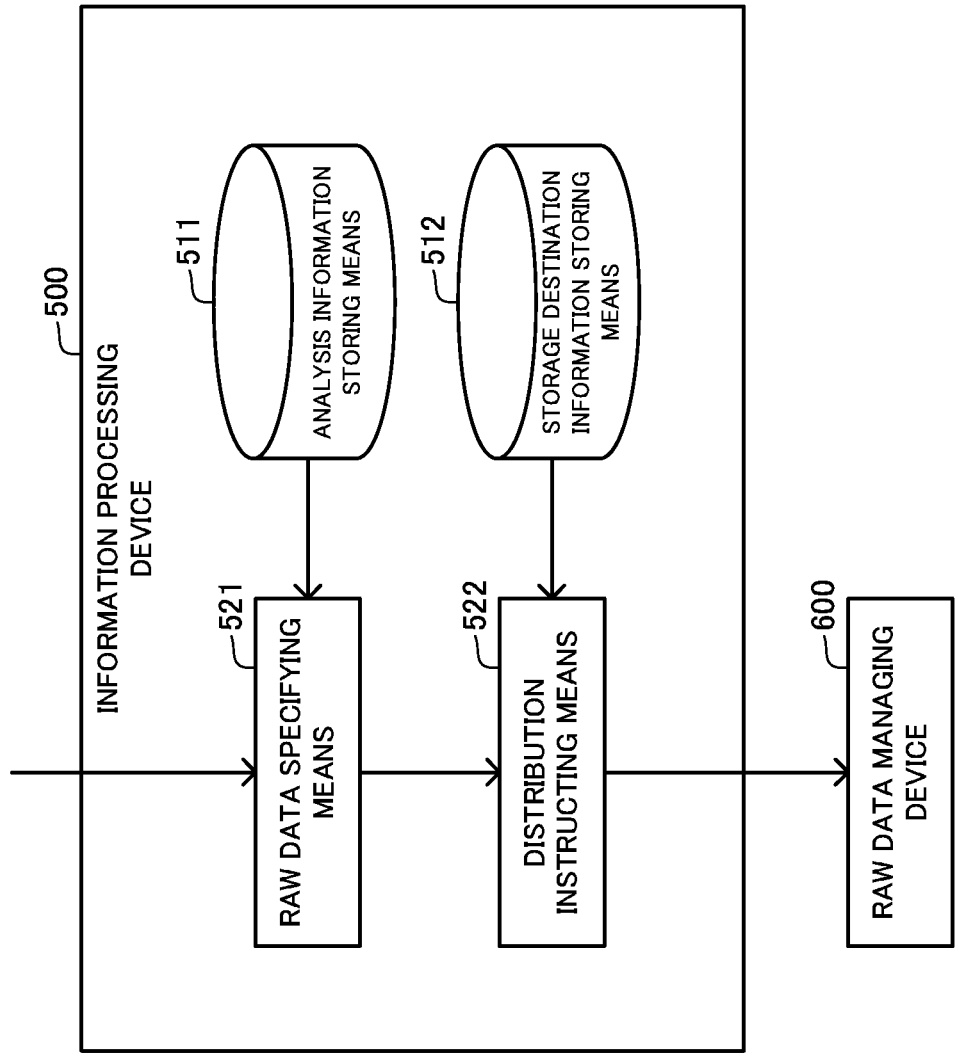
FIG. 13 is a diagram showing a configuration of a system in Supplementary Note 1 of the present invention.

The whole or part of the exemplary embodiments disclosed above can be described as the following supplementary notes. Below, the outline of configurations of an information processing device according to the present invention will be described with reference to FIG. 13. However, the present invention is not limited to the following configurations.

(Supplementary Note 1)

An information processing device 500 including:

an analysis information storing means 511 for storing each of raw data having been analyzed by a plurality of analysis engines, respectively, so as to be associated with analysis portion specification information that specifies a time portion in which the each raw data has been analyzed; and a storage destination information storing means 512 for storing each of the raw data analyzed by the analysis engines, respectively, so as to be associated with a raw data storage destination address that refers to a raw data managing device 600 in which the each raw data is stored and managed, the information processing device also including:

a raw data specifying means 521 for accepting portion designation information that designates a predetermined time portion in combined analysis result information obtained by integrating analysis results of analysis by the respective analysis engines, and specifying the raw data associated with the analysis portion specification information corresponding to the portion designation information, from inside the analysis information storing means 511; and a distribution instructing means 522 for acquiring the raw data storage destination address associated with the raw data specified by the raw data specifying means 521 from inside the storage destination information storing means 512, and instructing the raw data managing device 600 specified by the storage destination address to distribute the raw data of the time portion corresponding to the designated portion designation information.

(Supplementary Note 2)

The information processing device according to Supplementary Note 1, including an analysis information extracting means for: receiving the combined analysis result information from a combined analysis result generating device that integrates the results of the analysis by the plurality of analysis engines; extracting raw data specification information that specifies each of the raw data having been analyzed by the analysis engines, respectively, and the analysis portion specification information that specifies a time portion in which the each raw data has been analyzed, from the combined analysis result information; and storing into the analysis information storing means so as to be associated with each other.

(Supplementary Note 3)

The information processing device according to Supplementary Note 1 or 2, including an engine registering means for: receiving raw data specification information specifying each of the raw data analyzed by the analysis engines that output the analysis results included in the combined analysis result information, and the storage destination address referring to the raw data managing device storing and managing the each raw data, from the combined analysis result generating device that integrates the results of the analysis by the plurality of analysis engines; and registering the raw data specification information and the storage destination address into the storage destination information storing means so as to be associated with each other.

(Supplementary Note 4)

The information processing device according to any of Supplementary Notes 1 to 3, including an application information storing means for storing each of application devices each capable of acquiring the combined analysis result information from the plurality of analysis engines so as to be associated with a raw data reception address that specifies an address at which the each application device receives the raw data, wherein:

the raw data specifying means is configured to accept the portion designation information from the application device; and the distribution instructing means is configured to acquire the raw data reception address corresponding to the application device having accepted the portion designation information, from inside the application information storing means, and instruct the raw data managing device specified by the raw data storage destination address acquired from inside the storage destination storing means to distribute the raw data to the acquired raw data reception address.

(Supplementary Note 5)

The information processing device according to any of Supplementary Notes 1 to 4, including a distribution target selecting means for, in a case that more than one of the raw data specified by the raw data specifying means are associated with one of the analysis portion specification information in the analysis information storing means, selecting same raw data as the raw data associated with a time portion before or after the one analysis portion specification information, wherein the distribution instructing means is configured to instruct to distribute the raw data selected by the distribution target selecting means.

(Supplementary Note 6)

The information processing device according to any of Supplementary Notes 1 to 5, wherein:

the analysis information storing means is configured to store each of the raw data so as to be associated with a timestamp that specifies time and date when the each raw data has been analyzed, as the analysis portion specification information;

the raw data specifying means is configured to accept timestamp designation information that designates predetermined time and date in the combined analysis result information as the portion designation information, and specifying the raw data associated with the timestamp information corresponding to the time and date specified by the timestamp designation information from inside the analysis information storing means; and the distribution instructing means is configured to instruct the raw data storing means specified by the raw data storage destination address acquired from inside the storage destination information storing means to distribute the raw data with the time and date corresponding to the timestamp designation information.

(Supplementary Note 7)

An information processing system including:

a combined analysis result generating device being equipped with a plurality of analysis engines, integrating analysis results of analysis of raw data by the respective analysis engines, and including a raw data managing device that stores and manages each of the raw data;

an application device receiving combined analysis result information from the combined analysis result generating device; and an information processing device connected with the combined analysis result generating device and the application device, wherein the information processing device includes:

an analysis information storing means for storing each of the raw data so as to be associated with analysis portion specification information that specifies a time portion in which the each raw data has been analyzed; and a storage destination information storing means for storing each of the raw data so as to be associated with a raw data storage destination address that refers to the raw data managing device; and wherein the information processing device also includes:

a raw data specifying means for accepting portion designation information that designates a predetermined time portion in the combined analysis result information from the application device, and specifying the raw data associated with the analysis portion specification information corresponding to the portion designation information, from inside the analysis information storing means; and a distribution instructing means for acquiring the raw data storage destination address associated with the raw data specified by the raw data specifying means from inside the storage destination information storing means, and instructing the raw data managing device specified by the storage destination address to distribute the raw data of the time portion corresponding to the designated portion designation information to the application device.

(Supplementary Note 8)

The information processing system according to Supplementary Note 7, wherein the information processing device includes an analysis information extracting means for: receiving the combined analysis result information from the combined analysis result generating device; extracting raw data specification information that specifies each of the raw data having been analyzed by the analysis engines, respectively, and the analysis portion specification information that specifies a time portion in which the each raw data has been analyzed, from the combined analysis result information; and storing into the analysis information storing means so as to be associated with each other.

(Supplementary Note 9)

A computer program including instructions for causing an information processing device, which includes: an analysis information storing means for storing each of raw data having been analyzed by a plurality of analysis engines, respectively, so as to be associated with analysis portion specification information that specifies a time portion in which the each raw data has been analyzed; and a storage destination information storing means for storing each of the raw data analyzed by the analysis engines, respectively, so as to be associated with a raw data storage destination address that refers to a raw data managing device in which the each raw data is stored and managed, to realize:

a raw data specifying means for accepting portion designation information that designates a predetermined time portion in combined analysis result information obtained by integrating analysis results of analysis by the respective analysis engines, and specifying the raw data associated with the analysis portion specification information corresponding to the portion designation information, from inside the analysis information storing means; and a distribution instructing means for acquiring the raw data storage destination address associated with the raw data specified by the raw data specifying means from inside the storage destination information storing means, and instructing the raw data managing device specified by the storage destination address to distribute the raw data of the time portion corresponding to the designated portion designation information.

(Supplementary Note 10)

The computer program according to Supplementary Note 9, including instructions for causing the information processing device to realize an analysis information extracting means for: receiving the combined analysis result information from a combined analysis result generating device that integrates the results of the analysis by the plurality of analysis engines; extracting raw data specification information that specifies each of the raw data having been analyzed by the analysis engines, respectively, and the analysis portion specification information that specifies a time portion in which the each raw data has been analyzed, from the combined analysis result information; and storing into the analysis information storing means so as to be associated with each other.

(Supplementary Note 11)

An information processing method including, by an information processing device, which includes: an analysis information storing means for storing each of raw data having been analyzed by a plurality of analysis engines, respectively, so as to be associated with analysis portion specification information that specifies a time portion in which the each raw data has been analyzed; and a storage destination information storing means for storing each of the raw data analyzed by the analysis engines, respectively, so as to be associated with a raw data storage destination address that refers to a raw data managing device in which the each raw data is stored and managed:

accepting portion designation information that designates a predetermined time portion in combined analysis result information obtained by integrating analysis results of analysis by the respective analysis engines, and specifying the raw data associated with the analysis portion specification information corresponding to the portion designation information, from inside the analysis information storing means; and acquiring the raw data storage destination address associated with the raw data specified by the raw data specifying means from inside the storage destination information storing means, and instructing the raw data managing device specified by the storage destination address to distribute the raw data of the time portion corresponding to the designated portion designation information.

(Supplementary Note 12)

The information processing method according to Supplementary Note 11, including, by the information processing device: receiving the combined analysis result information from a combined analysis result generating device that integrates the results of the analysis by the plurality of analysis engines; extracting raw data specification information that specifies each of the raw data having been analyzed by the analysis engines, respectively, and the analysis portion specification information that specifies a time portion in which the each raw data has been analyzed, from the combined analysis result information; and storing into the analysis information storing means so as to be associated with each other.

The present invention is based upon and claims the benefit of priority from Japanese patent application No. 2010-248208, filed on Nov. 5, 2010, the disclosure of which is incorporated herein in its entirety by reference.

DESCRIPTION OF REFERENCE NUMERALS

1 application
2 raw data distribution instructing device
21 raw data distribution instructing unit
211 instruction target raw data search processing unit
212 distribution instruction processing unit
213 distribution target selection processing unit 22 application registering unit
23 engine registering unit
24 distribution information storing unit
241 application storing unit
242 linked information storing unit
243 engine storing unit
25 linked information extracting unit
3 engine unit
31 combined analysis result generating device
32, 33 analysis engine
34, 35 raw data managing device
36, 37 raw data storing unit
38, 39 encoder
40, 41 raw data
500 information processing device
511 analysis information storing means
512 storage destination information storing means
521 raw data specifying means
522 distribution instructing means
600 raw data managing device

What is claimed is:

1. An information processing device comprising a CPU and a storage device:
   the storage device comprising:
     an analysis information storing unit for storing each of a plurality of raw data having been analyzed by a plurality of analysis engines, respectively, in association with analysis portion specification information that specifies a time portion in which each of the plurality of raw data has been analyzed; and
     a storage destination information storing unit for storing each of the plurality of raw data analyzed by the analysis engines, respectively, in association with a raw data storage destination address that refers to a raw data managing device in which each of the plurality of raw data is stored and managed,
   the information processing device also comprising:
     an analysis information extracting unit, implemented by the CPU, for: receiving combined analysis result information obtained by integrating results of analysis from the plurality of analysis engines by a combined analysis result generating device; extracting raw data specification information that specifies each of the plurality of raw data having been analyzed by the analysis engines, respectively, and the analysis portion specification information that specifies a time portion in which each of the plurality of raw data has been analyzed, from the combined analysis result information; and storing into the analysis information storing unit so as to be associated with each other;
     a raw data specifying unit, implemented by the CPU, for accepting portion designation information that designates a predetermined time portion in combined analysis result information obtained by integrating analysis results of analysis by the respective analysis engines, and specifying the raw data associated with the analysis portion specification information corresponding to the portion designation information, from inside the analysis information storing unit; and
     a distribution instructing unit, implemented by the CPU, for acquiring the raw data storage destination address associated with the raw data specified by the raw data specifying unit from inside the storage destination information storing unit, and instructing the raw data managing device specified by the storage destination address to distribute the raw data of the time portion corresponding to the designated portion designation information.

2. The information processing device according to claim 1, comprising an engine registering unit for: receiving raw data specification information specifying each of the raw data analyzed by the analysis engines that output the analysis results included in the combined analysis result information, and the storage destination address referring to the raw data managing device storing and managing the each raw data, from the combined analysis result generating device that integrates the results of the analysis by the plurality of analysis engines; and registering the raw data specification information and the storage destination address into the storage destination information storing unit so as to be associated with each other.

3. The information processing device according to claim 1, comprising an application information storing unit for storing each of application devices each capable of acquiring the combined analysis result information from the plurality of analysis engines so as to be associated with a raw data reception address that specifies an address at which the each application device receives the raw data, wherein:
   the raw data specifying unit is configured to accept the portion designation information from the application device; and
   the distribution instructing unit is configured to acquire the raw data reception address corresponding to the application device having accepted the portion designation information, from inside the application information storing unit, and instruct the raw data managing device specified by the raw data storage destination address acquired from inside the storage destination storing unit to distribute the raw data to the acquired raw data reception address.

4. The information processing device according to claim 1, comprising a distribution target selecting unit for, in a case that more than one of the raw data specified by the raw data specifying unit are associated with one of the analysis portion specification information in the analysis information storing unit, selecting same raw data as the raw data associated with a time portion before or after the one analysis portion specification information, wherein the distribution instructing unit is configured to instruct to distribute the raw data selected by the distribution target selecting unit.

5. The information processing device according to claim 1, wherein:
   the analysis information storing unit is configured to store each of the raw data so as to be associated with a timestamp that specifies time and date when the each raw data has been analyzed, as the analysis portion specification information;
   the raw data specifying unit is configured to accept timestamp designation information that designates predetermined time and date in the combined analysis result information as the portion designation information, and specifying the raw data associated with the timestamp information corresponding to the time and date specified by the timestamp designation information from inside the analysis information storing unit; and
   the distribution instructing unit is configured to instruct the raw data storing unit specified by the raw data storage destination address acquired from inside the storage destination information storing unit to distribute the raw data with the time and date corresponding to the timestamp designation information.

6. An information processing system comprising:
a combined analysis result generating device being equipped with a plurality of analysis engines, integrating analysis results of analysis of a plurality of raw data by the respective analysis engines, and including a raw data managing device that stores and manages each of the plurality of raw data;
an application device receiving combined analysis result information from the combined analysis result generating device; and
an information processing device connected with the combined analysis result generating device and the application device,
wherein the information processing device comprises a CPU and a storage device:
the storage device comprising:
an analysis information storing unit for storing each of the plurality of raw data so as to be associated with analysis portion specification information that specifies a time portion in which each of the plurality of raw data has been analyzed; and
a storage destination information storing unit for storing each of the plurality of raw data so as to be associated with a raw data storage destination address that refers to the raw data managing device; and
wherein the information processing device also comprises:
an analysis information extracting unit, implemented by the CPU, for: receiving combined analysis result information obtained by integrating results of analysis from the plurality of analysis engines by a combined analysis result generating device; extracting raw data specification information that specifies each of the plurality of raw data having been analyzed by the analysis engines, respectively, and the analysis portion specification information that specifies a time portion in which each of the plurality of raw data has been analyzed, from the combined analysis result information; and storing into the analysis information storing unit so as to be associated with each other;
a raw data specifying unit, implemented by the CPU, for accepting portion designation information that designates a predetermined time portion in the combined analysis result information from the application device, and specifying the raw data associated with the analysis portion specification information corresponding to the portion designation information, from inside the analysis information storing unit; and
a distribution instructing unit, implemented by the CPU, for acquiring the raw data storage destination address associated with the raw data specified by the raw data specifying unit from inside the storage destination information storing unit, and instructing the raw data managing device specified by the storage destination address to distribute the raw data of the time portion corresponding to the designated portion designation information to the application device.

7. A non-transitory computer-readable medium storing a program comprising instructions for causing an information processing device, which comprises: an analysis information storing unit for storing a plurality of raw data having been analyzed by a plurality of analysis engines, respectively, so as to be associated with analysis portion specification information that specifies a time portion in which each of the plurality of raw data has been analyzed; and a storage destination information storing unit for storing each of the plurality of raw data analyzed by the analysis engines, respectively, so as to be associated with a raw data storage destination address that refers to a raw data managing device in which each of the plurality of raw data is stored and managed, to realize:
an analysis information extracting unit, implemented by the CPU, for: receiving combined analysis result information obtained by integrating results of analysis from the plurality of analysis engines by a combined analysis result generating device; extracting raw data specification information that specifies each of the plurality of raw data having been analyzed by the analysis engines, respectively, and the analysis portion specification information that specifies a time portion in which each of the plurality of raw data has been analyzed, from the combined analysis result information; and storing into the analysis information storing unit so as to be associated with each other;
a raw data specifying unit for accepting portion designation information that designates a predetermined time portion in combined analysis result information obtained by integrating analysis results of analysis by the respective analysis engines, and specifying the raw data associated with the analysis portion specification information corresponding to the portion designation information, from inside the analysis information storing unit; and
a distribution instructing unit for acquiring the raw data storage destination address associated with the raw data specified by the raw data specifying unit from inside the storage destination information storing unit, and instructing the raw data managing device specified by the storage destination address to distribute the raw data of the time portion corresponding to the designated portion designation information.

8. An information processing method comprising, by an information processing device, which comprises: an analysis information storing unit for storing a plurality of raw data having been analyzed by a plurality of analysis engines, respectively, so as to be associated with analysis portion specification information that specifies a time portion in which each of the plurality of raw data has been analyzed; and a storage destination information storing unit for storing each of the plurality of raw data analyzed by the analysis engines, respectively, so as to be associated with a raw data storage destination address that refers to a raw data managing device in which each of the plurality of raw data is stored and managed:
receiving combined analysis result information obtained by integrating results of analysis from the plurality of analysis engines by a combined analysis result generating device; extracting raw data specification information that specifies each of the plurality of raw data having been analyzed by the analysis engines, respectively, and the analysis portion specification information that specifies a time portion in which each of the plurality of raw data has been analyzed, from the combined analysis result information; and storing into the analysis information storing unit so as to be associated with each other;
accepting portion designation information that designates a predetermined time portion in combined analysis result information obtained by integrating analysis results of analysis by the respective analysis engines, and specifying the raw data associated with the analysis portion specification information corresponding to the portion designation information, from inside the analysis information storing unit;
acquiring the raw data storage destination address associated with the raw data specified by the raw data specifying unit from inside the storage destination information storing unit, and instructing the raw data managing device specified by the storage destination address to distribute the raw data of the time portion corresponding to the designated portion designation information.

* * * * *